(12) United States Patent
Guzman Estrada et al.

(10) Patent No.: US 12,047,620 B2
(45) Date of Patent: Jul. 23, 2024

(54) BURN-IN SUBTITLE SIGNALING MECHANISM FOR AVOIDING TEXT OVERLAPPING WITH SUBTITLES

(71) Applicant: ARRIS Enterprises LLC, Suwanee, GA (US)

(72) Inventors: Domingo Guzman Estrada, Salinas Victoria (MX); Rene Martinez Esquivel, San Nicolas de los Garza (MX); Osvaldo Mendoza Narro, General Escobedo (MX)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 18/074,095

(22) Filed: Dec. 2, 2022

(65) Prior Publication Data

US 2023/0179809 A1 Jun. 8, 2023

Related U.S. Application Data

(60) Provisional application No. 63/285,862, filed on Dec. 3, 2021.

(51) Int. Cl.
*H04N 21/235* (2011.01)
*H04N 21/2343* (2011.01)
*H04N 21/431* (2011.01)
*H04N 21/485* (2011.01)

(52) U.S. Cl.
CPC ..... *H04N 21/2353* (2013.01); *H04N 21/2343* (2013.01); *H04N 21/235* (2013.01); *H04N 21/4316* (2013.01); *H04N 21/4858* (2013.01)

(58) Field of Classification Search
None
See application file for complete search history.

(56) References Cited

U.S. PATENT DOCUMENTS

| 11,070,891 | B1 * | 7/2021 | Effinger | H04N 21/43072 |
| 11,216,684 | B1 * | 1/2022 | Mahyar | G06T 5/005 |
| 2006/0222336 | A1 * | 10/2006 | Huang | H04N 9/8042 386/230 |
| 2011/0019088 | A1 * | 1/2011 | Kase | H04N 21/4884 348/E7.02 |
| 2020/0349381 | A1 * | 11/2020 | Wang | G06V 30/19173 |

* cited by examiner

*Primary Examiner* — Clayton R Williams
(74) *Attorney, Agent, or Firm* — Chernoff, Vilhauer, McClung & Stenzel, LLP

(57) ABSTRACT

An encoder for use with video data, first supplemental data, second supplemental data, and a display device. The encoder includes: a memory; and a processor configured to execute instructions stored on the memory to cause the encoder to: generate modified video data based on an incorporation of the first supplemental data into the video data such that the supplemental video will be displayed at a predetermined location when the modified video is displayed on the display device; generate metadata associated with the predetermined location; generate an encoded transport stream including the modified video data, the metadata and the second supplemental data; and transmit the encoded transport stream to the display device so as to enable the display device to decode the encoded transport stream and display the modified video and the second supplemental video such that the second supplemental video is not displayed at the predetermined location.

18 Claims, 9 Drawing Sheets

BURN-IN SUBTITLE SIGNALING MECHANISM FOR AVOIDING TEXT OVERLAPPING WITH SUBTITLES

CROSS REFERENCE TO RELATED APPLICATIONS

The present application claims priority to U.S. Provisional App. No. 63/285,862 filed Dec. 3, 2021, the content of which is incorporated herein by reference in its entirety.

BACKGROUND

Embodiments of the invention relate to encoding and decoding data.

SUMMARY

Aspects of the present invention are drawn to an encoder for use with video data, first supplemental data, second supplemental data, and a display device, the video data corresponding to a video to be displayed on the display device, the first supplemental data corresponding to a supplemental video, the first supplemental data to be incorporated into the video data so as to generate modified video data corresponding to a modified video to be displayed on the display device, the second supplemental data corresponding to a second supplemental video to be superimposed on the modified video to be displayed on the display device, the encoder including: a memory; a processor configured to execute instructions stored on the memory to cause the encoder to: generate the modified video data based on an incorporation of the first supplemental data into the video data such that the supplemental video will be displayed at a predetermined location when the modified video is displayed on the display device; generate metadata associated with the predetermined location; generate an encoded transport stream including the modified video data, the metadata and the second supplemental data; and transmit the encoded transport stream to the display device so as to enable the display device to decode the encoded transport stream and display the modified video and the second supplemental video such that the second supplemental video is not displayed at the predetermined location.

In some embodiments, the processor is configured to execute instructions stored on the memory to cause the encoder to transmit the encoded transport stream to the display device so as to enable the display device to decode the encoded transport stream and display the modified video and the second supplemental video such that the second supplemental video is displayed at a second predetermined location, wherein the predetermined location is different from the second predetermined location.

In some embodiments, the processor is configured to execute instructions stored on the memory to cause the encoder to transmit the encoded transport stream to the display device so as to enable the display device to decode the encoded transport stream and display the modified video and the second supplemental video such that the second supplemental video is displayed at a second location, wherein the predetermined location is different from the second location.

In some embodiments, the processor is configured to execute instructions stored on the memory to additionally cause the encoder to generate the encoded transport stream including the audio data.

Other aspects of the present disclosure are drawn to a method of using an encoder with video data, first supplemental data, second supplemental data, and a display device, the video data corresponding to a video to be displayed on the display device, the first supplemental data corresponding to a supplemental video, the first supplemental data to be incorporated into the video data so as to generate modified video data corresponding to a modified video to be displayed on the display device, the second supplemental data corresponding to a second supplemental video to be superimposed on the modified video to be displayed on the display device, the method including: generating, via a processor configured to execute instructions stored on a memory, the modified video data based on an incorporation of the first supplemental data into the video data such that the supplemental video will be displayed at a predetermined location when the modified video is displayed on the display device; generating, via the processor, metadata associated with the predetermined location; generating, via the processor, an encoded transport stream including the modified video data, the metadata and the second supplemental data; and transmitting, via the processor, the encoded transport stream to the display device so as to enable the display device to decode the encoded transport stream and display the modified video and the second supplemental video such that the second supplemental video is not displayed at the predetermined location.

In some embodiments, the method, wherein the transmitting the encoded transport stream to the display device includes transmitting the encoded transport stream to the display device so as to enable the display device to decode the encoded transport stream and display the modified video and the second supplemental video such that the second supplemental video is displayed at a second predetermined location, and wherein the predetermined location is different from the second predetermined location.

In some embodiments, the method, wherein the transmitting the encoded transport stream to the display device includes transmitting the encoded transport stream to the display device so as to enable the display device to decode the encoded transport stream and display the modified video and the second supplemental video such that the second supplemental video is displayed at a second predetermined location, and wherein the predetermined location is different from the second location.

In some embodiments, the method, for further use with audio data associated with the first supplemental data, wherein the generating, via the processor, the encoded transport stream including the modified video data, the metadata and the second supplemental data includes generating the encoded transport stream including the audio data.

Other aspect of the present disclosure are drawn to a non-transitory, computer-readable media having computer-readable instructions stored thereon, the computer-readable instructions being capable of being read by an encoder for use with video data, first supplemental data, second supplemental data, and a display device, the video data corresponding to a video to be displayed on the display device, the first supplemental data corresponding to a supplemental video, the first supplemental data to be incorporated into the video data so as to generate modified video data corresponding to a modified video to be displayed on the display device, the second supplemental data corresponding to a second supplemental video to be superimposed on the modified video to be displayed on the display device, wherein the computer-readable instructions are capable of instructing the encoder to perform the method including: generating, via a processor configured to execute instructions stored on a memory, the modified video data based on an incorporation of the first supplemental data into the video data such that the supplemental video will be displayed at a predetermined location when the modified video is displayed on the display device; generating, via the processor, metadata associated with the predetermined location; generating, via the processor, an encoded transport stream including the modified video data, the metadata and the second supplemental data; and transmitting, via the processor, the encoded transport stream to the display device so as to enable the display device to decode the encoded transport stream and display the modified video and the second supplemental video such that the second supplemental video is not displayed at the predetermined location.

In some embodiments, the non-transitory, computer-readable media, wherein the computer-readable instructions are capable of instructing the encoder to perform the method wherein the transmitting the encoded transport stream to the display device includes transmitting the encoded transport stream to the display device so as to enable the display device to decode the encoded transport stream and display the modified video and the second supplemental video such that the second supplemental video is displayed at a second predetermined location, and wherein the predetermined location is different from the second predetermined location.

In some embodiments, the non-transitory, computer-readable media, wherein the computer-readable instructions are capable of instructing the encoder to perform the method wherein the transmitting the encoded transport stream to the display device includes transmitting the encoded transport stream to the display device so as to enable the display device to decode the encoded transport stream and display the modified video and the second supplemental video such that the second supplemental video is displayed at a second predetermined location, and wherein the predetermined location is different from the second location.

In some embodiments, the non-transitory, computer-readable media, for further use with audio data associated with the first supplemental data, wherein the computer-readable instructions are capable of instructing the encoder to perform the method wherein the generating, via the processor, the encoded transport stream including the modified video data, the metadata and the second supplemental data includes generating the encoded transport stream including the audio data.

Other aspects of the present disclosure are drawn to a decoder for use with an encoded transport stream and a display device, the encoded transport stream including modified video data, metadata, and second supplemental data, the modified video data corresponding to a modified video to be displayed on the display device and being based on an incorporation of first supplemental data into video data, the first supplemental data corresponding to a supplemental video to be displayed at a predetermined location when the modified video is displayed on the display device, the video data corresponding to a video to be displayed on the display device, the second supplemental data corresponding to a second supplemental video to be superimposed on the modified video to be displayed on the display device, the metadata being associated with the predetermined location, the decoder including: a memory; a processor configured to execute instructions stored on the memory to cause the decoder to: decode the encoded transport stream to generate the modified video data, the metadata, and the second supplemental data; and provide the modified video data and the second supplemental data to the display device such that, based on the meta data, the second supplemental data is not displayed at the predetermined location.

In some embodiments, the processor is configured to execute instructions stored on the memory to cause the decoder to transmit the encoded transport stream to the display device so as to enable the display device to provide the modified video data and the second supplemental data to the display device such that, based on the meta data, the second supplemental data is displayed at a second predetermined location, and wherein the predetermined location is different from the second predetermined location.

In some embodiments, the processor is configured to execute instructions stored on the memory to cause the decoder to transmit the encoded transport stream to the display device so as to enable the display device to provide the modified video data and the second supplemental data to the display device such that, based on the meta data, the second supplemental data is displayed at a second location, and wherein the predetermined location is different from the second location.

In some embodiments, the decoder, for further use with audio data associated with the first supplemental data, wherein the processor is configured to execute instructions stored on the memory to additionally cause the decoder to decode the encoded transport stream to generate the audio data.

Other aspects of the present disclosure are drawn to a method of using a decoder with an encoded transport stream and a display device, the encoded transport stream including modified video data, metadata, and second supplemental data, the modified video data corresponding to a modified video to be displayed on the display device and being based on an incorporation of first supplemental data into video data, the first supplemental data corresponding to a supplemental video to be displayed at a predetermined location when the modified video is displayed on the display device, the video data corresponding to a video to be displayed on the display device, the second supplemental data corresponding to a second supplemental video to be superimposed on the modified video to be displayed on the display device, the metadata being associated with the predetermined location, the method including: decoding, via a processor configured to execute instructions stored on a memory, the encoded transport stream to generate the modified video data, the metadata, and the second supplemental data; and providing, via the processor, the modified video data and the second supplemental data to the display device such that, based on the meta data, the second supplemental data is not displayed at the predetermined location.

In some embodiments, the method, wherein the providing, via the processor, the modified video data and the second supplemental data to the display device includes providing the modified video data and the second supplemental data to the display device such that, based on the meta data, the second supplemental data is displayed at a second predetermined location, and wherein the predetermined location is different from the second predetermined location.

In some embodiments, the method, wherein the providing, via the processor, the modified video data and the second supplemental data to the display device includes providing the modified video data and the second supplemental data to the display device such that, based on the meta data, the second supplemental data is displayed at a second location, and wherein the predetermined location is different from the second location.

In some embodiments, the method, for further use with audio data associated with the first supplemental data, wherein the decoding the encoded transport additionally generates the audio data.

Other aspects of the present disclosure are drawn to a non-transitory, computer-readable media having computer-readable instructions stored thereon, the computer-readable instructions being capable of being read by a decoder for use with an encoded transport stream and a display device, the encoded transport stream including modified video data, metadata, and second supplemental data, the modified video data corresponding to a modified video to be displayed on the display device and being based on an incorporation of first supplemental data into video data, the first supplemental data corresponding to a supplemental video to be displayed at a predetermined location when the modified video is displayed on the display device, the video data corresponding to a video to be displayed on the display device, the second supplemental data corresponding to a second supplemental video to be superimposed on the modified video to be displayed on the display device, the metadata being associated with the predetermined location, wherein the computer-readable instructions are capable of instructing the decoder to perform the method including: decoding, via a processor configured to execute instructions stored on a memory, the encoded transport stream to generate the modified video data, the metadata, and the second supplemental data; and providing, via the processor, the modified video data and the second supplemental data to the display device such that, based on the meta data, the second supplemental data is not displayed at the predetermined location.

In some embodiments, the non-transitory, computer-readable media, wherein the computer-readable instructions are capable of instructing the encoder to perform the method wherein the providing, via the processor, the modified video data and the second supplemental data to the display device includes providing the modified video data and the second supplemental data to the display device such that, based on the meta data, the second supplemental data is displayed at a second predetermined location, and wherein the predetermined location is different from the second predetermined location.

In some embodiments, the non-transitory, computer-readable media, wherein the computer-readable instructions are capable of instructing the encoder to perform the method wherein the providing, via the processor, the modified video data and the second supplemental data to the display device includes providing the modified video data and the second supplemental data to the display device such that, based on the meta data, the second supplemental data is displayed at a second location, and wherein the predetermined location is different from the second location.

In some embodiments, the non-transitory, computer-readable media, for further use with audio data associated with the first supplemental data, wherein the computer-readable instructions are capable of instructing the encoder to perform the method wherein the decoding the encoded transport additionally generates the audio data.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

Video content may be provided to a video display device to be watched by a user. Some video content, such as movies, may include textual information like closed captions and subtitles that are displayed within the video to provide viewers with additional, interpretive information, or oftentimes simply a textual translation of the audio track. This information may be provided to a video receiver as text strings through Teletext or Close captions in analog video signals, or through data packets in Moving Picture Experts Group (MPEG) video streams. Alternatively, the text may be burned (embedded) within the video frames by an encoder prior to its transmission. This embedded text may be referred to as burnt-in static text regions, which will be described in greater detail with reference to FIGS. 1A-1B.

Figure 1A:
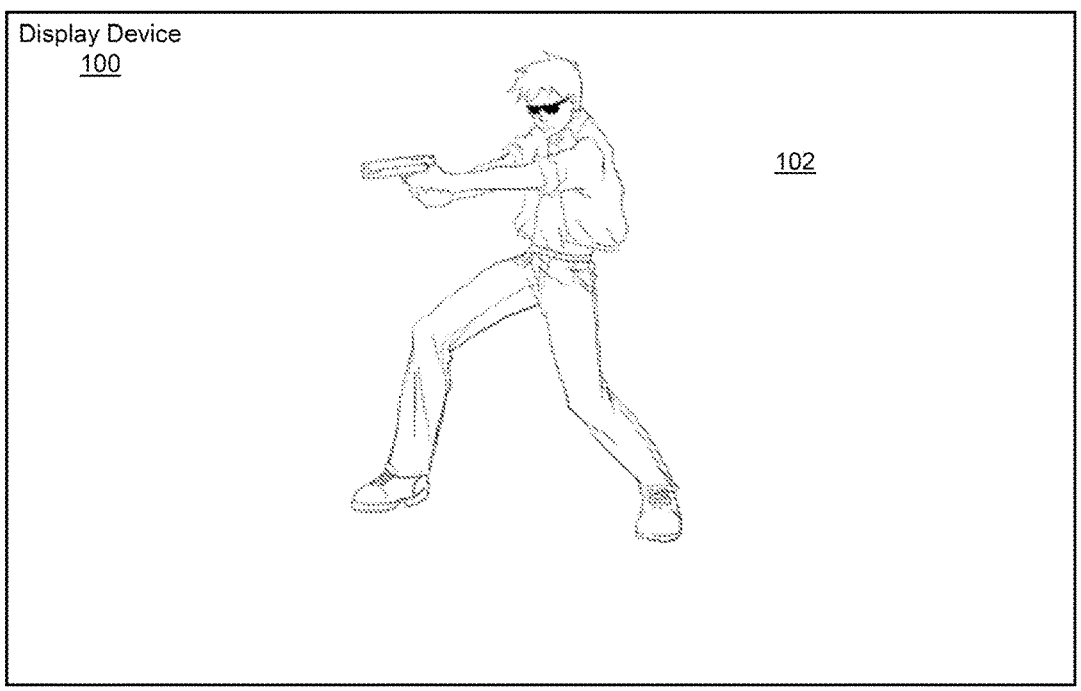
FIG. 1A illustrates a display device at a time $t_0$.
Figure 1B:
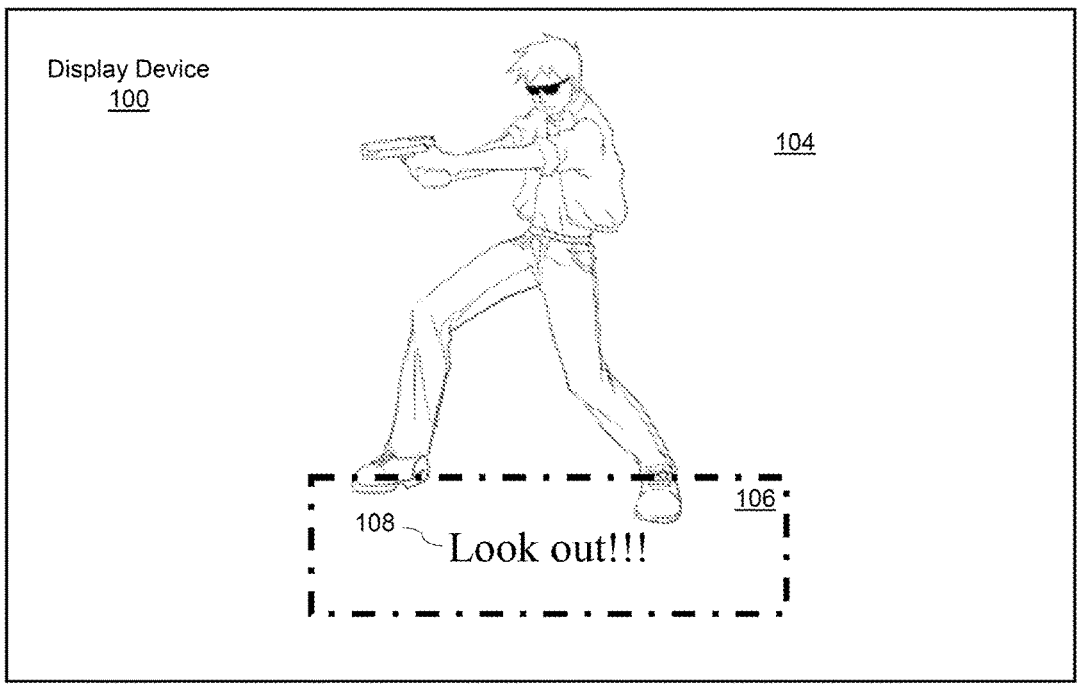
FIG. 1B illustrates display device at a time $t_1$.

Specifically, FIG. 1A illustrates a display device 100 at a time $t_0$ that displays an image 102, which represents one of a plurality of sequential frames of a movie, generated from video data provided to the display device. FIG. 1B, in turn, illustrates the display device 100 at a time $t_1$ while it displays an image 104 comprising another frame of the movie. On the bottom of the image 104 is a predetermined subtitle location 106, within which are subtitles 108. For purposes of discussion, let the movie that is being watched by the viewer have an associated audio track that is not in the language of the viewer. For example, for purposes of discussion, let the movie have an audio track that is in French. Further, when this video was encoded, there was a decision by the distribution company that the largest market speaks English and not French. Therefore, to please the largest English-speaking market, English subtitles corresponding to the French audio track are added to the video. More specifically, the English subtitles are burned-into the video, wherein they cannot be removed. In particular, supplemental data corresponding to supplemental video, which in this case is supplemental subtitle image data corresponding to the subtitles, is incorporated in the video data of the original video to create modified video data, which will generate a modified video—i.e., the original video with the subtitles burned therein. Accordingly, as compared to image 102 of FIG. 1A, image 104 of FIG. 1B includes the content of image 102 in addition to subtitles 108 at location 106 of image 102.

In some cases, a viewer may want a different set of subtitles. For example, and for purposes of discussion, consider the example discussed above with reference to FIG. 1B, where the video has audio track that is in French, and English subtitles corresponding to the French audio track are burned into the video and cannot be removed. Still further, suppose the viewer doesn't understand French or read English but, in this example, only understands and reads Spanish. Luckily, the video content is provided with additional optional subtitle choices, where one of the subtitle choices is Spanish. In such a case, the user may choose the Spanish subtitles. However, the newly-chosen Spanish subtitles are not burned into the video; rather, the supplemental data corresponding to the Spanish subtitles is added to the modified video data such that the Spanish subtitles are superimposed on the modified video data.

Figure 1C:
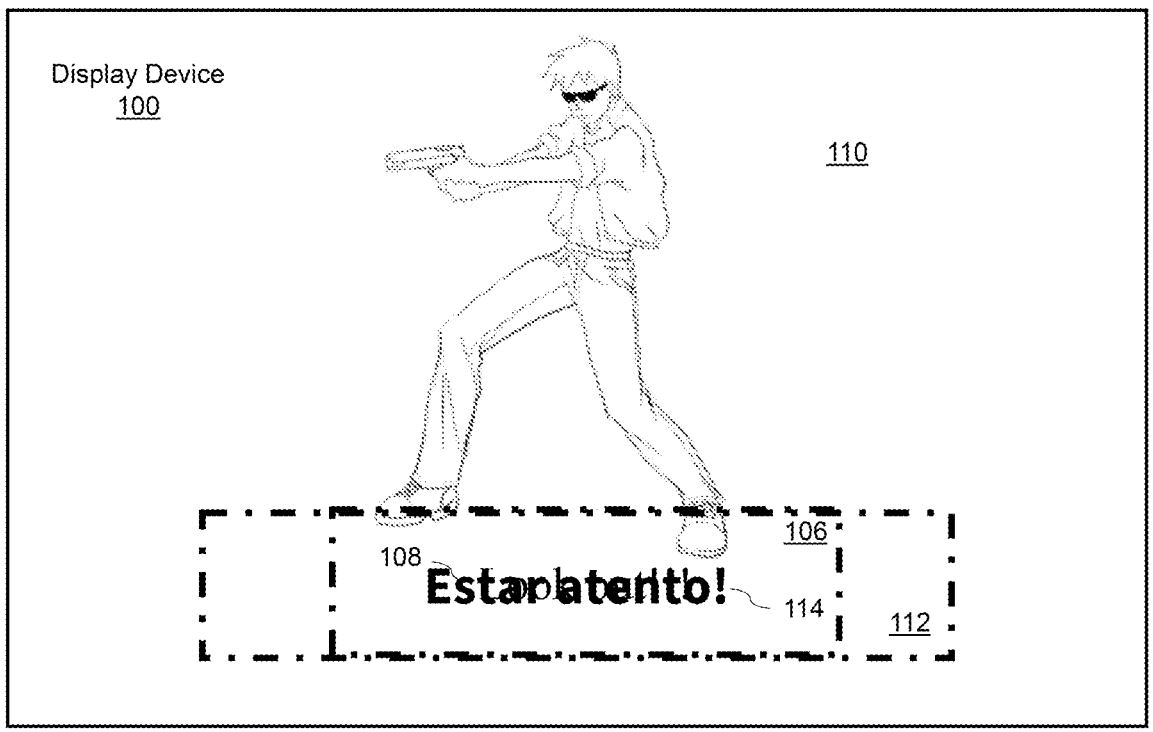
FIG. 1C illustrates display device at a time $t_2$.

However, there are many instances wherein the second supplemental data, which in this case is the data corresponding to the Spanish subtitles, is decoded so as to display the Spanish subtitles in an area that overlaps the original English burned-in subtitles. With the subtitles overlapping, the user will have trouble reading the subtitles that they turned on. For example, FIG. 1C shows the display device 100 at a time $t_2$ when it displays a frame 104, at the bottom of which is predetermined subtitle location 106 and burned-in English subtitles 108. In addition, the user-selected Spanish subtitles 114 are shown within subtitle location 112, and overlap the burned-in subtitles 108. Accordingly, it is very hard for the viewer to read the Spanish subtitles because they overlap the English subtitles.

The encoding and decoding of video data of as discussed above with reference to FIGS. 1A-C will now be described in greater detail with reference to FIG. 2, which shows an exploded view of a prior art encoder 200, a prior art transport stream 218, and a prior art decoder 230. Encoder 200 preferably includes a controller 201 and a memory 213, and receives video data 202, audio data 204, audio data 206, subtitle data 208, and subtitle data 210. In some cases, at least one of controller 201 and memory 213 may be implemented as a computer having tangible computer-readable media for carrying or having computer-executable instructions or data structures stored thereon. Memory 213 additionally preferably contains instructions to allow controller 201 to encode data; and transport the encoded data to decoder 230.

Controller 201 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of encoder 200.

Video data 202 may be any form a visual media, a non-limiting example of which being a movie. Audio data 204 and audio data 206 may be any form of auditory media that corresponds with video data 202. For purposes of discussion only, let audio data 204 correspond to French audio corresponding to video data 202, and let audio data 206 correspond to English audio corresponding to video data 202. Subtitle data 208 and subtitle data 210 correspond with subtitles that may be displayed. For purposes of discussion only, let subtitle data 208 correspond to Spanish subtitles for either of French audio data 204 or English audio data 206, and let subtitle data 210 correspond to English subtitles for either of French audio data 204 or English audio data 206. Video data 202, French audio data 204, English audio data 206, Spanish subtitle data 208, and English subtitle data 210 may in some preferred embodiments be received by encoder 200 from an external source.

Video data 202 and English subtitle data 210 may be stored in memory 213, where it is stored as video data 214. Video data 214 may contain English subtitle data 210, which is converted to burn-in subtitle data 216. As it is burned in, burn-in subtitle data 216 alters video data 202, thereby converting it to video data 214.

Encoder 200 is a content provider that encodes data for the purpose of distributing it. In some cases, the content will be delivered on a physical media, a non-limiting example of which being a digital versatile disc (DVD). In some cases, the content will be provided through the use of a cable modem termination system (CMTS), in which a media provider provides content to the CMTS, which then provides it to encoder 200.

Encoder 200 encodes video data 214, which has stored therein burned-in subtitle data 216, French audio data 204, English audio data 206, and Spanish subtitle data 208, and transmits the encoded data to decoder 230 as transport stream 218 through communication channel 217. Communication channel 217 may be any known type of wired or wireless communication channel. In a broad sense, communication channel 217 may incorporate any combination of: wired communication channels, a non-limiting example of which includes Data Over Cable Service Interface Specification (DOCSIS), wireless communication channels, a non-limiting example of which includes a cellular network, and a media communication channel, a non-limiting example of which includes a DVD.

Figure 2:
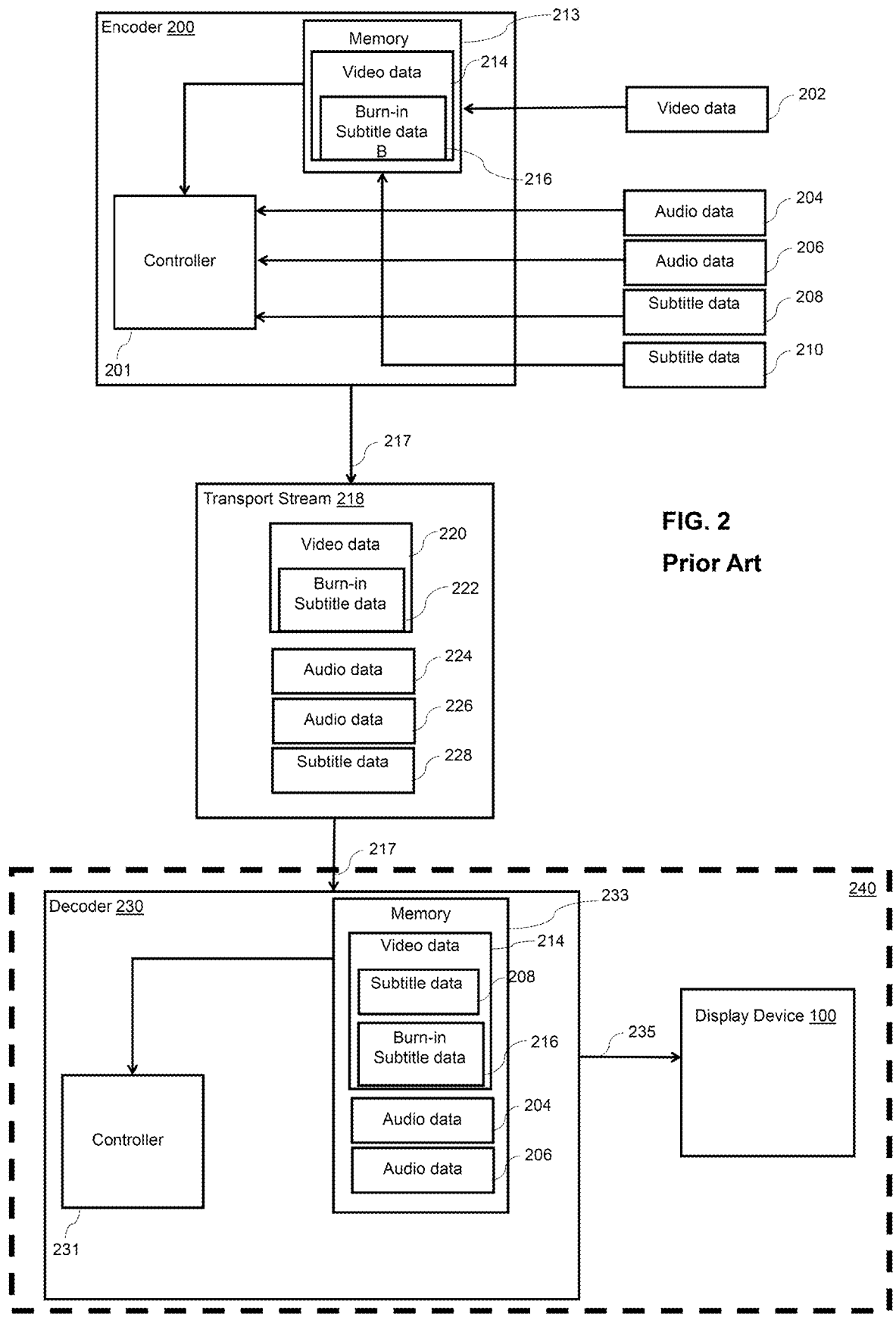
FIG. 2 illustrates an exploded view of a prior art encoder, a prior art transport stream, and a prior art decoder.

As shown in FIG. 2 transport stream 218 includes encoded video data 220, which has stored therein encoded burn-in subtitle data 222, and also includes encoded audio data 224, encoded audio data 226, and encoded subtitle data 228. Transport stream 218 contains the encoded data sent from encoder 200 to decoder 230.

As shown in FIG. 2, decoder 230 includes a controller 231 and a memory 233. Memory 233 has stored therein video data 214, which includes burned-in subtitle data 216, French audio data 204, English audio data 206, and Spanish subtitle data 208. In some cases, at least one of controller 231 and memory 233 may be implemented as a computer having tangible computer-readable media for carrying or having computer-executable instructions or data structures stored thereon. Controller 231 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of decoder 230.

Memory 233 has stored therein video data 214, which has stored therein Spanish subtitle data 208 and burned-in subtitle data 216, French audio data 204, and English audio data 206. Memory 233 additionally has instructions stored therein to allow controller 231 to receive data from encoder 200 and decode the encoded data.

Decoder 230 receives transport stream 218 from encoder 200. Controller 231 preferably executes instructions stored on memory 233 to decode transport stream 218. Decoder 230 may then transmit video data 214, which has stored therein Spanish subtitle data 208 and burn-in subtitle data 216, French audio data 204, and English audio data 206 to display device 100. In some cases, decoder 230 and display device 100 may be a unitary device, as shown by dotted box 240.

As shown in FIG. 2, decoder 230 transmits to display device 100 video data 214, which has stored therein burned-in subtitle data 216, French audio data 204, English audio data 206, and Spanish subtitle data 208. Display device 100 may display video data 214 as a video. The video will contain the contents of video data 202 in addition to burned-in subtitle data 216. If a user were to turn on the alternate subtitles, in the form of Spanish subtitle data 208, it is likely that they would appear in the same place as burned-in subtitle data 216. As burned-in subtitle data 216 is burned into the video, it cannot be removed as Spanish subtitle data 208 can. If the user has no use for burn-in subtitle data 216, then it will merely obstruct their view of Spanish subtitle data 208. This can be frustrating for users who want to select their own language for subtitles. What is needed, therefore, is a system and method for displaying alternate subtitles in a location different from burned in subtitles.

Systems and methods in accordance with the present disclosure displays alternate subtitles in a location different from burned in subtitles. Specifically, in some disclosed embodiments, an encoder receives video data, audio data, and subtitle data from an external source. The subtitle data may be burned into the video data, modifying it. Metadata may be generated to determine the location of the burned in subtitle data. The encoder may receive supplemental audio data and subtitle data different from the original audio and subtitle data. The encoder may encode all the data and transmit it to a decoder. The decoder may decode the data and superimpose the second set of subtitle data onto the modified video data. Because the decoder receives the metadata indicating the location of the burned-in subtitles, if other subtitles are chosen to be displayed, the decoder may decode the other subtitles such that they will be displayed in a different location than the first set of subtitles—which are burned into the video. The decoder may transmit the data to a display device to be viewed by a user, wherein the burned-in subtitles do not obstruct the view of the alternate chosen subtitles.

Figure 3:
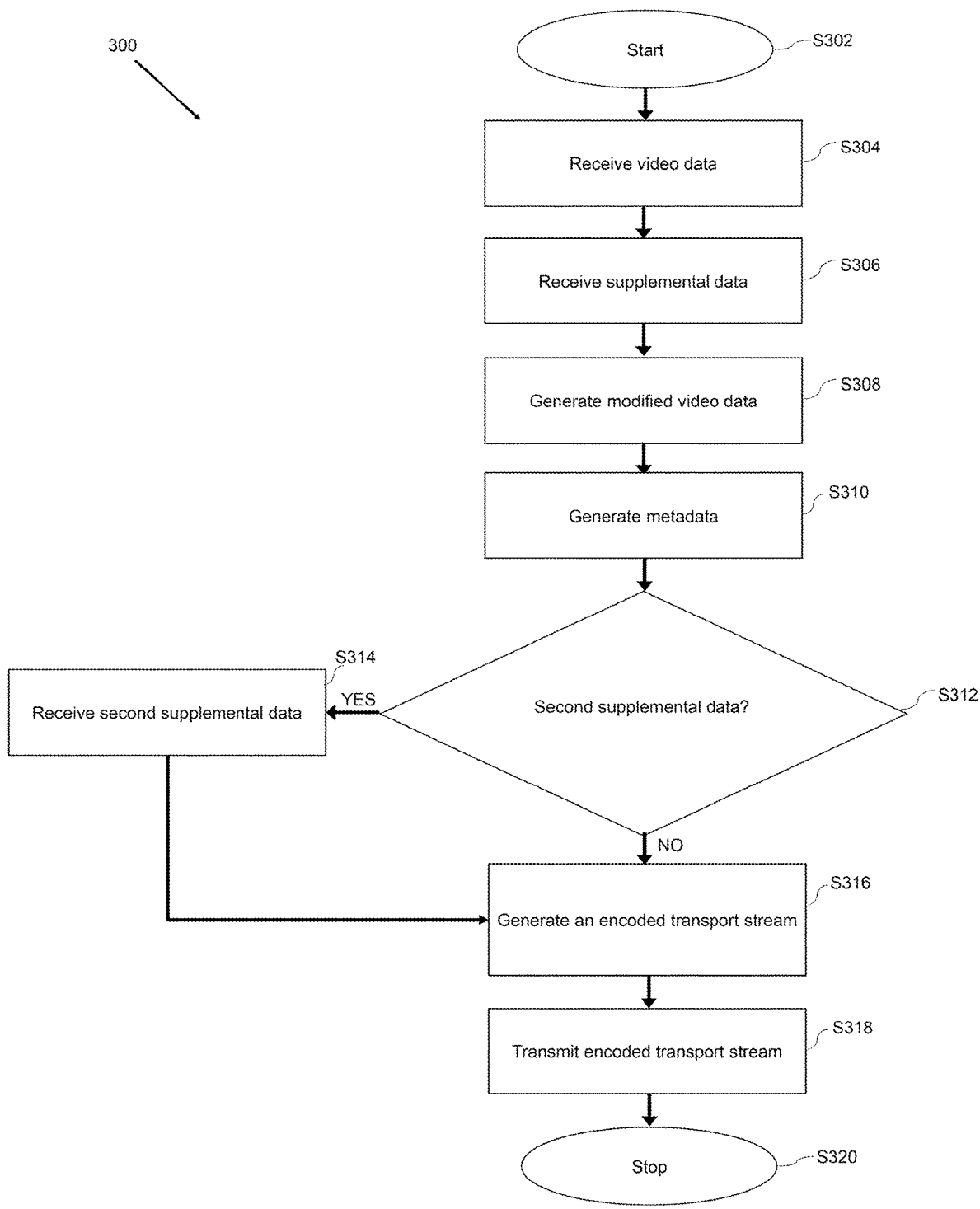
FIG. 3 illustrates a method for encoding data and transporting it to a decoder in accordance with aspects of the present disclosure.

Exemplary systems and methods for displaying alternate subtitles in a location different from burned in subtitles in accordance with aspects of the present disclosure will now be described in greater detail with reference to FIG. 3 to FIG. 6C. Specifically, FIG. 3 shows an exemplary method 300 to be executed by a processor for encoding and transporting data to a decoder in accordance with aspects of the present disclosure. As shown in this figure, method 300 begins (S302) and an encoder receives video data (S304) as will be described in greater detail with reference to FIG. 4, which illustrates an exploded view of encoder 400, transport stream 406, decoder 410, and display device 420 in accordance with aspects of the present disclosure. In some embodiments, encoder 400 may receive video data 202 from a data provider, a non-limiting example of which may be a cable modem termination system (CMTS).

Figure 4:
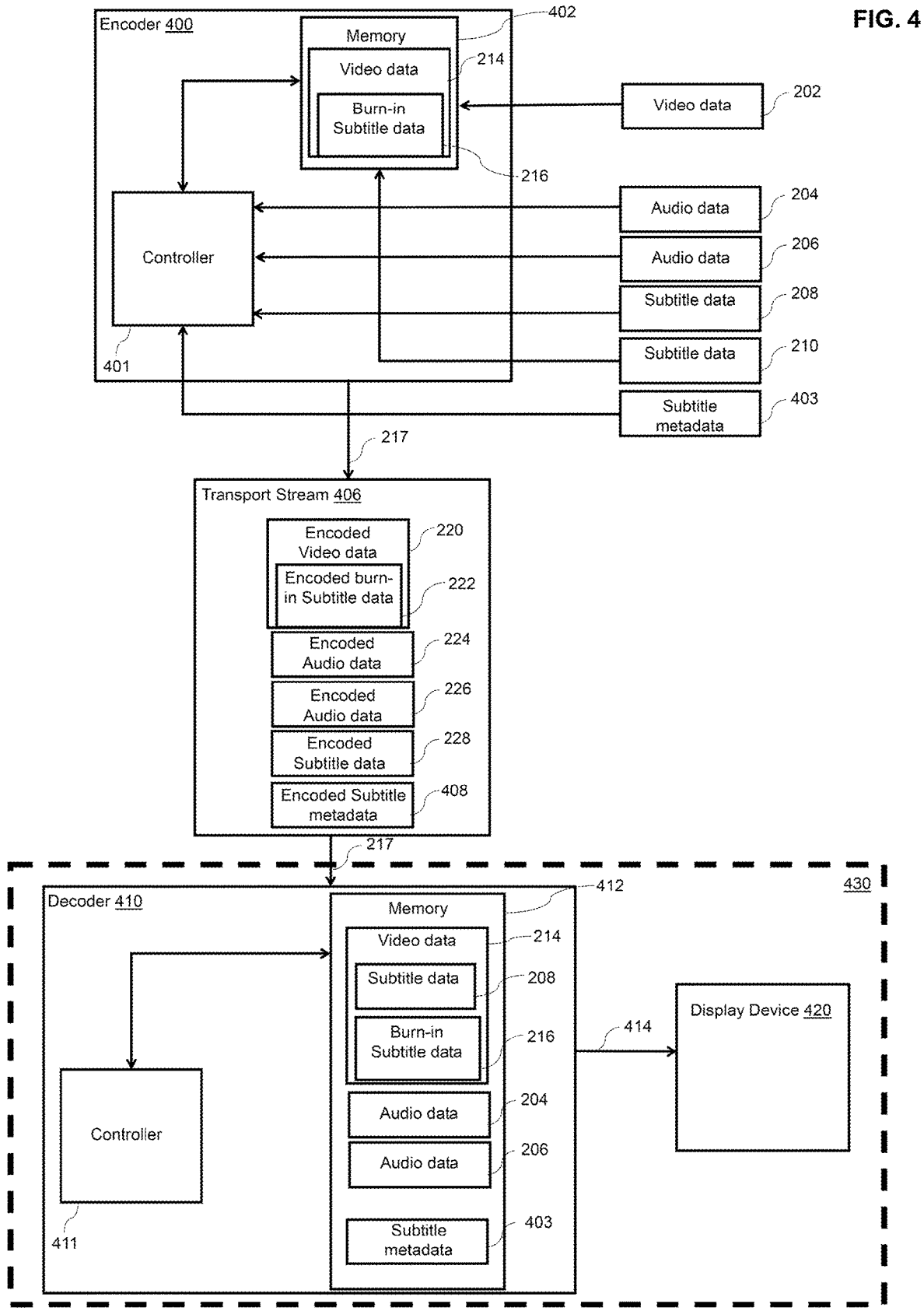
FIG. 4 illustrates an exploded view of an encoder, a transport stream, and a decoder in accordance with aspects of the present disclosure.

As shown in FIG. 4, encoder 400 includes a controller 401 and a memory 402. Encoder 400 receives video data 202, French audio data 204, English audio data 206, Spanish subtitle data 208, English subtitle data 210, and subtitle metadata 403. Memory 402 has stored therein video data 214 and burn-in subtitle data 216. In some embodiments, at least one of controller 401 and memory 402 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, DVD, floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 401 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of encoder 400 in accordance with the embodiments described in the present disclosure.

Memory 402, as will be described in greater detail below, has instructions stored therein to cause encoder 400 to generate video data 214 based on an incorporation of the burn-in subtitle data 216 into video data 202 such that English subtitle data 210 will be displayed at a predetermined location when the modified video is displayed on display device 420, as well as to generate subtitle metadata 403 associated with the predetermined location, generate transport stream 406 including encoded video data 220, encoded subtitle metadata 408 and encoded subtitle data 228, and to transmit transport stream 406 to display device 420 so as to enable display device 420 to decode transport stream 406 and display video data 214 and Spanish subtitle data 208 such that the Spanish subtitle data 208 is not displayed at the predetermined location.

In some embodiments, memory 402, as will be described in greater detail below, has instructions stored therein to cause encoder 400 to transmit transport stream 406 to display device 420 so as to enable display device 420 to decode transport stream 406 and display video data 214 and encoded subtitle data 228 such that Spanish subtitle data 208 is displayed at a second predetermined location, wherein the predetermined location is different from the second predetermined location.

In some embodiments, memory 402, as will be described in greater detail below, has instructions stored therein to cause encoder 400 to transmit transport stream 406 to display device 420 so as to enable display device 420 to decode transport stream 406 and display video data 214 and Spanish subtitle data 208 such that Spanish subtitle data 208 is displayed at a second location, wherein the predetermined location is different from the second location.

In some embodiments, memory 402, as will be described in greater detail below, has instructions stored therein to cause encoder 400 to generate transport stream 406 including French audio data 204 and English audio data 206.

Subtitle metadata 403 contains the location of burned-in subtitle data 216. Subtitle metadata 403 preferably ensures that Spanish subtitle data 208 is displayed in a different location than that of burned-in subtitle data 216. In some embodiments, subtitle metadata 403 is provided to encoder 400 from an external source, such as the content provider that is providing video data 202, French audio data 204, English audio data 206, Spanish subtitle data 208, and English subtitle data 210. However, in some embodiments, controller 401 may generate subtitle metadata 403 when burned-in subtitle data 216 is created.

Transport stream 406 includes encoded video data 220, which has stored therein encoded burned-in subtitle data 222, encoded audio data 224, encoded audio data 226, encoded subtitle data 228, and subtitle metadata 403. Transport stream 406 contains the encoded data sent from encoder 400 to decoder 410. While the encoded data is labeled with new numbers, the data is the same. Once decoded, the data will revert back to its original state.

Decoder 410 includes: a controller 411 and a memory 412. Memory 412 contains video data 214, which has stored therein burn-in subtitle data 216, French audio data 204, English audio data 206, Spanish subtitle data 208, and subtitle metadata 403. In some embodiments, at least one of controller 411 and memory 412 may be implemented as a computer having tangible computer-readable media for carrying or having computer-executable instructions or data structures stored thereon.

Controller 411 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of decoder 410 in accordance with the embodiments described in the present disclosure.

Memory 412, as will be described in greater detail below, has instructions stored therein to cause decoder 410 to decode transport stream 406 to generate video data 214, subtitle metadata 403, and Spanish subtitle data 208, and also to provide video data 214 and Spanish subtitle data 208 to display device 420 such that, based on subtitle metadata 403, Spanish subtitle data 208 is not displayed at the predetermined location.

In some embodiments, memory 412, as will be described in greater detail below, has instructions stored therein to cause decoder 410 to transmit transport stream 406 to display device 420 so as to enable display device 420 to provide video data 214 and Spanish subtitle data 208 to display device 420 such that, based on subtitle metadata 403, Spanish subtitle data 208 is displayed at a second predetermined location, and wherein the predetermined location is different from the second predetermined location.

Decoder 410 may receive transport stream 406 from encoder 400. Controller 411 may execute instructions stored on memory 412 to cause decoder 410 to decode transport stream 406. Decoder 410 may then transmit video data 214, which has stored therein Spanish subtitle data 208 and burn-in subtitle data 216, French audio data 204, English audio data 206, and subtitle metadata 403 to display device 420.

Display device 420 may be any known device or system to display an image to a user. In some embodiments, decoder 410 and display device 420 will be a unitary device, as shown by dotted box 430.

Returning to FIG. 3, after the encoder receives the video data (S304), the encoder preferably receives the supplemental data (S306). For example, presume that encoder 400 also receives French audio data 204, English audio data 206, Spanish subtitle data 208, and English subtitle data 210 from a CMTS. French audio data 204 and English audio data 206 are associated with Spanish subtitle data 208 and English subtitle data 210 respectively, as referenced in FIG. 4.

After the encoder receives the supplemental data (S306), modified video data is generated (S308). In an example embodiment, the modified video data corresponds to a modified video which includes the original video having subtitles burned in. For example, with reference to FIG. 4, controller 401 may execute instructions stored on memory 402 to allow encoder 400 to alter video data 202. English subtitle data 210 may therefore be burned into video data 202, creating video data 214, which is stored in memory 402 as burned-in subtitle data 216.

Returning to FIG. 3, after the modified video data is generated (S308), the metadata is generated (S310). For example, with reference to FIG. 4, encoder 400 will also generate subtitle metadata 403. After subtitle data 216 is burned into video data 214, controller 401 may execute instructions stored on memory 402 to allow encoder 400 to determine the predetermined location of burned-in subtitle data 216. This predetermined location is the location for which the burned-in subtitles will be displayed. This will be described in greater detail with reference to FIG. 6A, which illustrates a display device 420 at a time $t_0$.

Figure 6A:
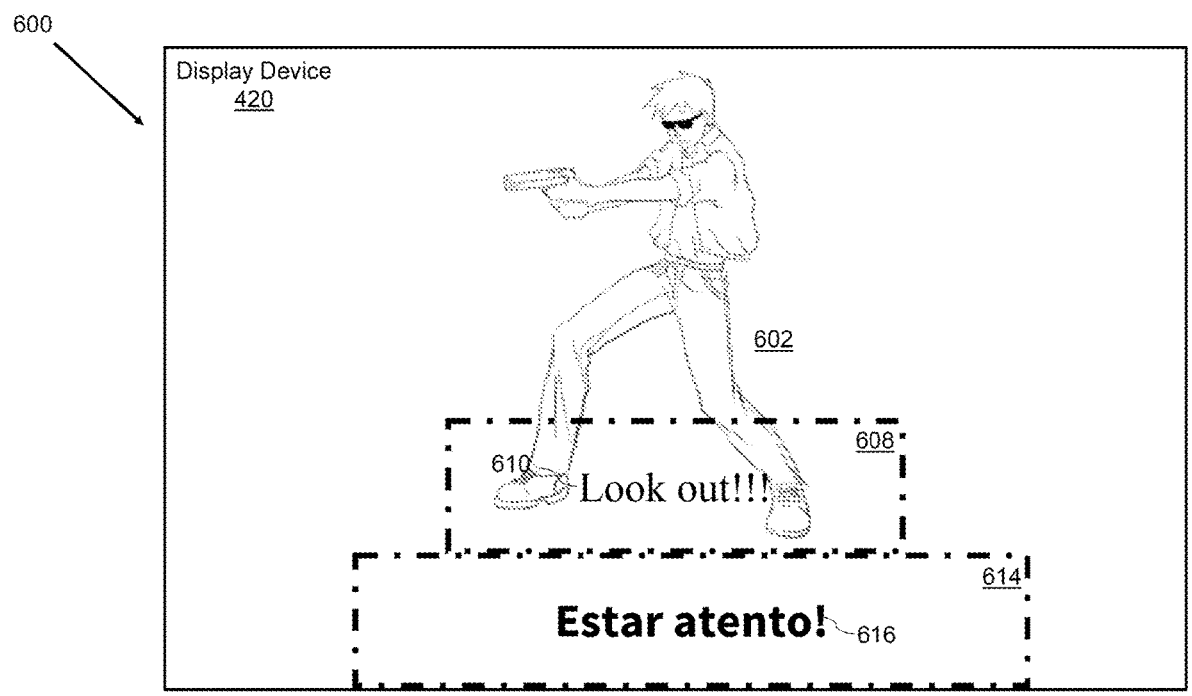
FIG. 6A illustrates a display device at a time $t_0$ in accordance with aspects of the present disclosure.

As shown in FIG. 6A, display device 420 may display an image 602, predetermined subtitle location 608, English subtitles 610, subtitle location 614, and subtitles 616. Predetermined subtitle location 608 corresponds to the predetermined location of where the subtitles will be displayed. As such, subtitle metadata 403 is the location, on the video display, where the subtitles corresponding to burned-in subtitle data 216 will be displayed. As shown in the figure, the location where the subtitles corresponding to burned-in subtitle data 216 is predetermined subtitle location 608.

In accordance with aspects of the present disclosure, in some embodiments, controller 401 executes instruction in memory 402 to generate subtitle metadata 403 when English subtitle data 210 is being burned into video data 202 to create video data 214 with burned in subtitle data 216. As noted above, in some embodiments, controller 401 generates subtitle metadata 403 by receiving subtitle metadata 403 from an external source. In such embodiments, controller 401 then executes instruction in memory 402 to burn subtitle data 210 into video data 202 in accordance with the received metadata 403.

Returning to FIG. 3, after the metadata is generated (S310), it may be determined if there is second supplemental data available (S312). For example, controller 401 may execute instructions stored on memory 402 to allow encoder 400 to determine if there is subtitle data in addition to English subtitle data 210. In some cases, a media provider may provide multiple subtitles to reach markets of various languages. In this non-limiting example, Spanish subtitle data 208 is additionally provided.

If it is determined there is no second supplemental data available (N at S312), then an encoded transport stream is generated (S316). For example, with reference to FIG. 4, presume that encoder 400 only receives English subtitle data 210, controller 401 may execute instructions stored on memory 402 to allow encoder 400 to encode video data 214, which has stored therein burned-in subtitle data 216, English audio data 206, and subtitle metadata 403. The encoded data is shown as transport stream 406.

It should be noted that encoder 400 may encode data to create transport stream 406 by any known encoding scheme, a non-limiting example of which includes MPEG. It should also be noted that encoder 400 may encode data to create transport stream 406 in a manner in which decoder 410 is configured to decode the encoded data as transport stream 406.

Returning to FIG. 3, after an encoded transport stream is generated (S316), the encoded transport stream is transmitted (S318). For example, with reference to FIG. 4, encoder 400 may transmit transport stream 406 to decoder 410 over communication channel 217. Video data 214, burned-in subtitle data 216, English audio data 206 and subtitle metadata 403 are encoded into encoded video data 220, encoded burned-in subtitle data 222, encoded audio data 226 and encoded subtitle metadata 408 respectively.

Returning to FIG. 3, after the encoded transport stream is transmitted (S318), method 300 stops (S320). In this case, the transmitted encoded data does not include any subtitle data other than the subtitle data that is burned into the video data. As such, there is no threat of a user choosing to use another set of subtitles that will be displayed over the burned-in subtitles, as discussed above with reference to FIG. 1C.

If it is determined there is second supplemental data (at S312), it is received (S314). For example, with reference to FIG. 4, presume that encoder 400 additionally receives Spanish subtitle data 208; with subtitle metadata 403, display device 420 will be able to display Spanish subtitle data 208 in a location different from location 106 of subtitles 108 as shown in FIG. 1B corresponding to burned-in subtitle data 216.

Returning to FIG. 3, after the second supplemental data is received (S314), then an encoded transport stream is generated (S316) and the encoded transport stream is transmitted (S318). Both of these processes may be performed in a manner similar to that discussed above.

Once transmitted, a display device may receive the encoded video data and display the video data. More importantly, in accordance with aspects of the present disclosure, the displayed video may include the burned-in subtitles but may also include other subtitles that are not superimposed on the burned-in subtitles. As such, in accordance with aspects of the present invention, the displayed video may include subsequently chosen subtitles that are easily viewably because they are not superimposed on at the same location within the video as are those of the burned-in subtitles. This will be described in greater detail with reference to FIGS. 5-6C.

Figure 5:
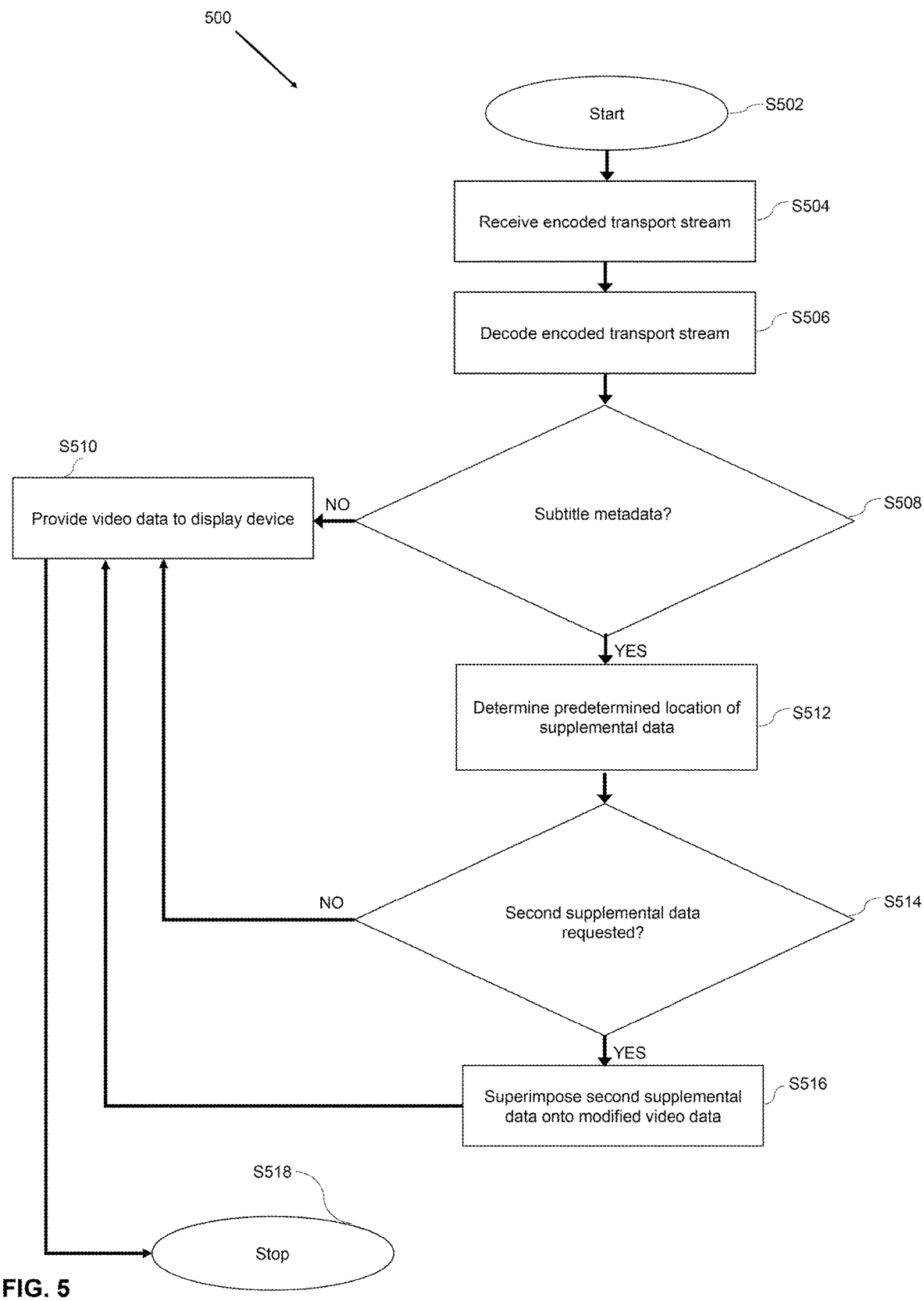
FIG. 5 illustrates a method for receiving encoded data from an encoder and decoding data in accordance with aspects of the present disclosure.

FIG. 5 illustrates a method 500 to be executed by a processor for receiving encoded data from an encoder and decoding data in accordance with aspects of the present disclosure. Specifically, the method starts (S502) and the encoded transport stream is received (S504). For example, with reference to FIG. 4, decoder 410 receives transport stream 406 from encoder 400.

Returning to FIG. 5, after the encoded transport stream is received (S504), the encoded transport stream may be decoded (S506). For example, with reference to FIG. 4, controller 411 may execute instructions stored on memory 412 to allow decoder 410 to decode transport stream 406. It should be noted that decoder 410 may decode the encoded data by any known decoding scheme, a non-limiting example of which includes MPEG. It should also be noted that decoder 410 may decode the encoded data in transport stream 406 in a manner corresponding to which encoder 400 is configured to encode the original data as transport stream 406.

Returning to FIG. 5, after the encoded transport stream is decoded (S506), it may be determined if there is subtitle metadata (S508). For example, with reference to FIG. 4, controller 411 may execute instructions stored on memory 412 to allow decoder 410 to determine if there is subtitle metadata available. In some embodiments, encoder 400 may encode data to create transport stream 406 to include a metadata field, which may include a header and a payload. In some of these embodiments, the header may be a predetermined number of bits. In some of these embodiments, the header may indicate that metadata is present in transport stream 406. In some embodiments, the header may indicate the size of the payload within transport stream 406. In some embodiments, the header may indicate the location of the payload within transport stream 406. The payload may indicate the location for which the supplemental data is located, or in other words, the location to which the burned-in subtitles will be displayed on the video when the video is played.

Returning to FIG. 5, if it is determined that there is no subtitle metadata available (N at S508), the video data may be provided to the display device (S510). For example, with reference to FIG. 4, presume that subtitle metadata 403 was not included in transport stream 406 from encoder 400. Decoder may then transmit video data 214, burned-in subtitle data 216, and English audio data 206 to display device 420.

Returning to FIG. 5, after the video data is provided to the display device (S510), method 500 stops (S518). In this situation, the video will merely be played with the original burned-in subtitles displayed in a manner similar to that discussed above with reference to FIG. 1B.

Returning to FIG. 5, if it is determined that there is subtitle metadata (Y at S508), then the predetermined location of the supplemental data is preferably determined (S512). For example, with reference to FIG. 4, presume that decoder 410 determines that subtitle metadata 403 is included in transport stream 406. Controller 411 may execute instructions stored on memory 412 to allow decoder 410 to analyze subtitle metadata 403, access the payload of the metadata, and determine the location of the video at which the subtitles, corresponding to burned-in subtitle data 216, will be displayed on the video when the video is played.

Returning to FIG. 5, after the predetermined location of the supplemental data is determined (S512), it is preferably determined if there is second supplemental data requested (S514). For example, decoder 410 may determine if the user watching display device 420 has requested for the subtitles associated with Spanish subtitle data 208. The user may request additional subtitles by any known method, a non-limiting example of which includes a commonly used user interface menu (not shown) that may be accessed by the user to choose additional subtitles.

Returning to FIG. 5, if it is determined that there is no second supplemental data requested (N at S514), then the video data is provided to the display device (S510). For example, with reference to FIG. 4, decoder 410 may determine that the user watching display device 420 has not requested the subtitles associated with Spanish subtitle data 208. In this situation, although Spanish subtitles are offered, the user does not want to use them when watching the video. As such, only burned-in subtitle data 216 will be displayed, decoder 410 will then transmit video data 214, which has stored therein burn-in subtitle data 216, and English audio data 206 to display device 420. Again, in this situation, the video will merely be played with the original burned-in subtitles displayed in a manner similar to that discussed above with reference to FIG. 1B.

Returning to FIG. 5, if it is determined that there is second supplemental data requested (Y at S514), then the second supplemental data is superimposed onto the modified video data (S516). For example, if decoder 410 determines the user watching display device 420 has requested the subtitles associated with Spanish subtitle data 208 and French audio data 204, controller 411 may execute instructions stored on memory 412 to instruct decoder 410 to superimpose the Spanish subtitles, corresponding to Spanish subtitle data 208, at a location of the video that is different from the location of the burned-in subtitles, corresponding to subtitle data 216.

In some embodiments, subtitle metadata 403 includes a "HERE" instruction. The HERE instruction includes location instruction data to instruct decoder 410 as to the specific location where the Spanish subtitles, corresponding to Spanish subtitle data 208, should be superimposed on the video. The specific location will be located on the video such that the Spanish subtitles are not superimposed on the video at the location of the burned-in subtitles, corresponding to subtitle data 216

In some embodiments, subtitle metadata 403 includes an "ANYWHERE BUT HERE" instruction. The ANYWHERE BUT HERE instruction includes location instruction data to instruct decoder 410 to not superimpose the Spanish subtitles, corresponding to Spanish subtitle data 208, so as to be superimposed on the video at the location of the burned-in subtitles, corresponding to subtitle data 216. The ANYWHERE BUT HERE instruction embodiment differs from the HERE instruction embodiment discussed above in that in the ANYWHERE BUT HERE instruction embodiment, decoder 410 determines where to superimpose the Spanish subtitles. This determination may be implemented by any known process, a non-limiting example of which includes an a priori determination. On the other hand, in the HERE instruction embodiment, encoder 400 determines where to superimpose the Spanish subtitles. This determination may be implemented by any known process, a non-limiting example of which includes an a priori determination.

Returning to FIG. 5, after the second supplemental data is superimposed onto the modified video data (S516), the video data is provided to the display device (S510). For example, decoder 410 will transmit video data 214, burn-in subtitle data 216, French audio data 204, English audio data 206, and Spanish subtitle data 208 to display device 420. If a user turns on subtitles associated with Spanish subtitle data 208, they will then appear in a different location from the burned in subtitles associated with burn-in subtitle data 216. This will be described in greater detail with reference to FIGS. 6A-C.

As mentioned above, FIG. 6A illustrates display device 420 at a time $t_0$. As shown in FIG. 6A, predetermined subtitle location 608 is separated from subtitle location 614. English subtitles 610, associated with burn-in subtitle data 216, are displayed above Spanish subtitles 616, associated with subtitle data 208. For example, a user may watch video associated with video data 214. If the user chooses Spanish subtitles, then Spanish subtitles 616, associated with subtitle data 208, will be superimposed on the video so as to be displayed to the user in a location different from the location of English subtitles 610. In the figure, Spanish subtitles 616 are displayed directly below English subtitles 610, but Spanish subtitles 616 can be superimposed at any location that does not conflict with subtitle location 614.

In the example embodiments discussed above, non-limiting examples of English, French, and Spanish languages have been described. It should be noted that these examples are non-limiting and that any number of languages may be used in accordance with aspects of the present disclosure. Furthermore, as indicated previously, though displayed text in the form of subtitles has been used as an example, the disclosed systems and methods may be used with respect to other text that may be either burned-in or selectively displayed at the option of a user, such as additional contextual information about a displayed image, scrolling stock tickers, emergency alerts, etc. Thus, any image data may be used as the supplemental data in accordance with aspects of the present disclosure. Similarly, the second supplemental data that is associated with metadata and that corresponds to an image that will be superimposed on the modified video may be any image data a in accordance with aspects of the present disclosure. This will be described in greater detail with reference to FIGS. 6B-C.

Figure 6B:
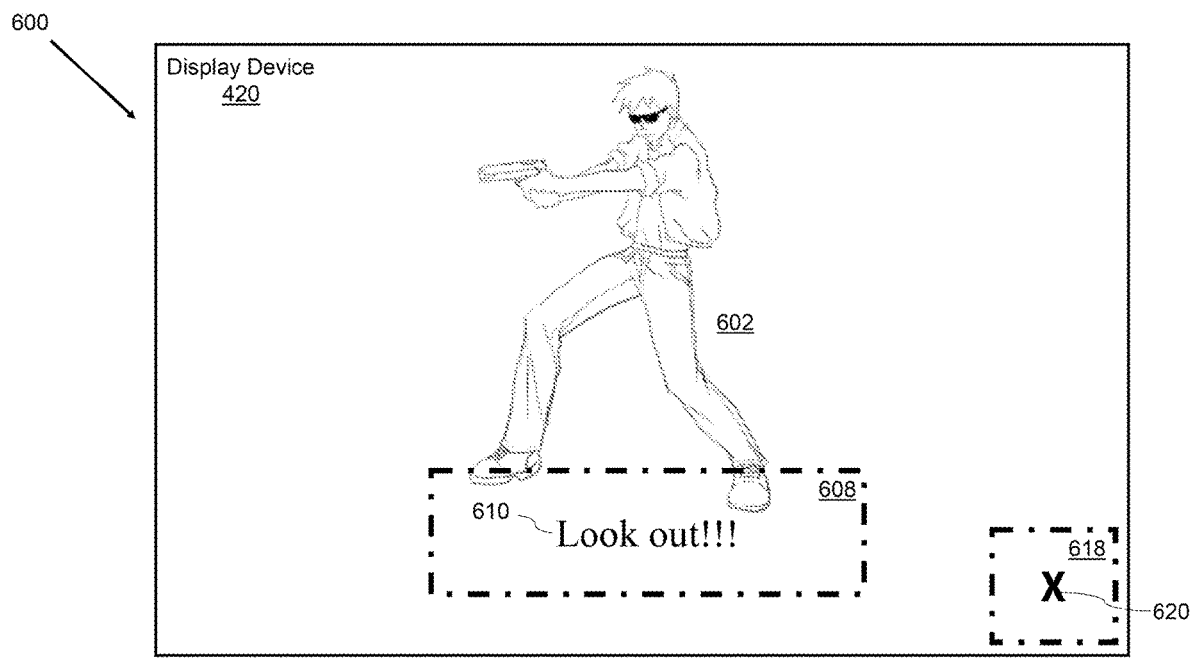
FIG. 6B illustrates a display device at a time $t_1$ in accordance with aspects of the present disclosure.

FIG. 6B illustrates another example embodiment of display device 420 at a time $t_1$ where display device 420 displays an image 602, predetermined subtitle location 608, English subtitles 610, supplemental data location 618, and a supplemental image 620. In this example embodiment, the second supplemental data associated with the metadata does not correspond to subtitles. Instead, in this embodiment, the second supplemental data associated with the meta data corresponds to network emblem or logo, shown as supplemental image 620. As shown in FIG. 6B, supplemental data location 618 superimposes supplemental image 620 at a different location from English subtitles 610, associated with burned-in subtitle data 216.

For example, presume that a network wants to include their logo within a movie that is provided to the viewer. The content provided by the network will include second supplemental data corresponding to supplemental image 620, such that supplemental image 620 be displayed to a user watching the video in a location different from the location of English subtitles 610.

Figure 6C:
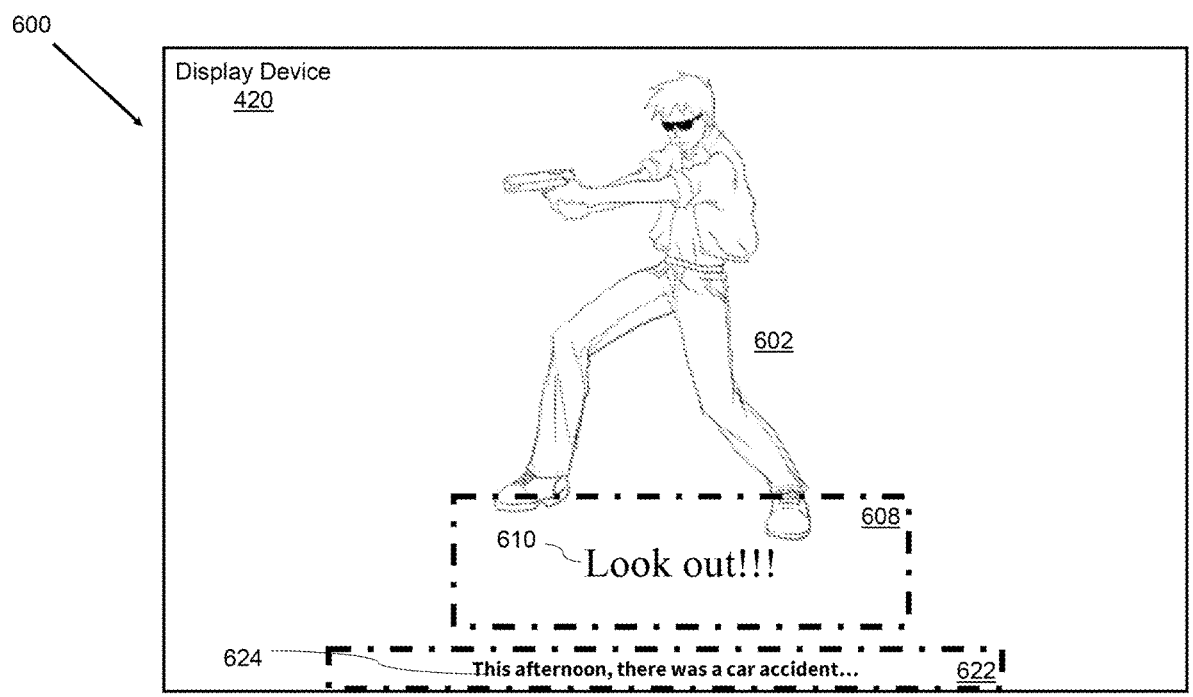
FIG. 6C illustrates a display device at a time $t_2$ in accordance with aspects of the present disclosure.

FIG. 6C illustrates another example embodiment of display device 420 at a time $t_2$ where display device 420 displays an image 602, predetermined subtitle location 608, English subtitles 610, and supplemental data location 622, and information 624. In this example embodiment, the second supplemental data associated with the metadata, again, does not correspond to subtitles. Instead, in this embodiment, the second supplemental data associated with the metadata corresponds to scrolling information, shown as information 624. As shown in FIG. 6C, supplemental data location 622 superimposes information 624 at a different location from English subtitles 610, associated with burned-in subtitle data 216.

For example, presume that a network wants to include a tickertape of sports scores, stock prices, major news events, etc., within a movie that is provided to the viewer. The content provided by the network will include second supplemental data corresponding to information 624, such that information 624 be displayed to a user watching the video in a location different from the location of English subtitles 610.

Some visual media contains subtitles that are burned into video, wherein they cannot be removed. If a user wants to use a different set of subtitles, it may prove to be difficult as the subtitles may overlap. This will obstruct the viewer's view of the subtitles that they are looking to use. In accordance with the present disclosure, systems and methods prevent non-burned-in subtitles from overlapping burned-in subtitles when they are presented at the same time on a video. This approach embeds and transmits, in the encoder side, spatial and temporal information related to the burnt-in subtitles as metadata. This information may be used a priori, on the decoder side to avoid text overlapping when displaying other non-burnt-int subtitles on the video.

In an example embodiment, an encoder may receive video data, and two sets of audio data and respective subtitle data. The first set of subtitle data will be burned into the video data, altering it. The encoder will generate subtitle metadata, detailing the location of the burned in subtitle data. The encoder will encode all the data and transmit it to a decoder. The decoder will decode the data, superimpose the alternate subtitles onto the modified video data. All of the data will then be transmitted to a display device. If a user turns on the alternate subtitles, they will display in a different location than that of the burned in subtitles. Thus, the present disclosure as disclosed displays alternate subtitles in a different location than burned in subtitles.

The operations disclosed herein may constitute algorithms that can be affected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An encoder for use with video data, first supplemental data, second supplemental data, and a display device, the video data corresponding to a video to be displayed on the display device, the first supplemental data corresponding to a supplemental video, the first supplemental data to be incorporated into the video data so as to generate modified video data corresponding to a modified video to be displayed on the display device, the second supplemental data corresponding to a second supplemental video to be superimposed on the modified video to be displayed on the display device, said encoder comprising:

a memory;
   a processor configured to execute instructions stored on said memory to cause said encoder to:
      generate the modified video data by incorporating the first supplemental data into the video data such that the supplemental video will be displayed at a predetermined location when the modified video is displayed on the display device;
      generate metadata associated with the predetermined location;
      generate an encoded transport stream including the modified video data, the metadata and the second supplemental data; and
      transmit the encoded transport stream to the display device.

2. The encoder of claim 1,
   wherein said processor is configured to execute instructions stored on said memory to cause said encoder to transmit the encoded transport stream to the display device such that the display device displays the second supplemental video at a second predetermined location different from the predetermined location.

3. The encoder of claim 1, for further use with audio data associated with the first supplemental data, wherein said processor is configured to execute instructions stored on said memory to additionally cause said encoder to generate the encoded transport stream including the audio data.

4. A method of using an encoder with video data, first supplemental data, second supplemental data, and a display device, the video data corresponding to a video to be displayed on the display device, the first supplemental data corresponding to a supplemental video, the first supplemental data to be incorporated into the video data so as to generate modified video data corresponding to a modified video to be displayed on the display device, the second supplemental data corresponding to a second supplemental video to be superimposed on the modified video to be displayed on the display device, said method comprising:
generating, via a processor configured to execute instructions stored on a memory, the modified video data by incorporating the first supplemental data into the video data such that the supplemental video will be displayed at a predetermined location when the modified video is displayed on the display device;
generating, via the processor, metadata associated with the predetermined location;
generating, via the processor, an encoded transport stream including the modified video data, the metadata and the second supplemental data; and
transmitting, via the processor, the encoded transport stream to the display device.

5. The method of claim 4,
wherein said processor is configured to execute instructions stored on said memory to cause said encoder to transmit the encoded transport stream to the display device such that the display device displays the second supplemental video at a second predetermined location different from the predetermined location.

6. The method of claim 4, for further use with audio data associated with the first supplemental data, wherein said generating, via the processor, the encoded transport stream including the modified video data, the metadata and the second supplemental data comprises generating the encoded transport stream including the audio data.

7. A non-transitory, computer-readable media having computer-readable instructions stored thereon, the computer-readable instructions being capable of being read by an encoder for use with video data, first supplemental data, second supplemental data, and a display device, the video data corresponding to a video to be displayed on the display device, the first supplemental data corresponding to a supplemental video, the first supplemental data to be incorporated into the video data so as to generate modified video data corresponding to a modified video to be displayed on the display device, the second supplemental data corresponding to a second supplemental video to be superimposed on the modified video to be displayed on the display device, wherein the computer-readable instructions are capable of instructing the encoder to perform the method comprising:
generating, via a processor configured to execute instructions stored on a memory, the modified video data by incorporating the first supplemental data into the video data such that the supplemental video will be displayed at a predetermined location when the modified video is displayed on the display device;
generating, via the processor, metadata associated with the predetermined location;
generating, via the processor, an encoded transport stream including the modified video data, the metadata and the second supplemental data; and
transmitting, via the processor, the encoded transport stream to the display device.

8. The non-transitory, computer-readable media of claim 7, wherein the computer-readable instructions are capable of instructing the encoder to perform the method wherein said transmitting the encoded transport stream to the display device comprises transmitting the encoded transport stream to the display device such that the display device displays the second supplemental video at a second predetermined location different from the predetermined location.

9. The non-transitory, computer-readable media of claim 7, for further use with audio data associated with the first supplemental data, wherein the computer-readable instructions are capable of instructing the encoder to perform the method wherein said generating, via the processor, the encoded transport stream including the modified video data, the metadata and the second supplemental data comprises generating the encoded transport stream including the audio data.

10. A decoder for use with an encoded transport stream and a display device, the encoded transport stream including modified video data, metadata, and second supplemental data, the modified video data corresponding to a modified video to be displayed on the display device by incorporating first supplemental data into video data, the first supplemental data corresponding to a supplemental video to be displayed at a predetermined location when the modified video is displayed on the display device, the video data corresponding to a video to be displayed on the display device, the second supplemental data corresponding to a second supplemental video to be superimposed on the modified video to be displayed on the display device, the metadata being associated with the predetermined location, said decoder comprising:
a memory;
a processor configured to execute instructions stored on said memory to cause said decoder to:
decode the encoded transport stream to generate the modified video data, the metadata, and the second supplemental data; and
provide the modified video data and the second supplemental data to the display device such that, based on the metadata, the second supplemental data is not displayed at the predetermined location.

11. The decoder of claim 10,
wherein said processor is configured to execute instructions stored on said memory to cause said decoder to transmit the encoded transport stream to the display device such that, based on the meta data, the second supplemental data is displayed at a second predetermined location different from the predetermined location.

12. The decoder of claim 10, for further use with audio data associated with the first supplemental data, wherein said processor is configured to execute instructions stored on said memory to additionally cause said decoder to decode the encoded transport stream to generate the audio data.

13. A method of using a decoder with an encoded transport stream and a display device, the encoded transport stream including modified video data, metadata, and second supplemental data, the modified video data corresponding to a modified video to be displayed on the display device by incorporating first supplemental data into video data, the first supplemental data corresponding to a supplemental video to be displayed at a predetermined location when the modified video is displayed on the display device, the video data corresponding to a video to be displayed on the display device, the second supplemental data corresponding to a second supplemental video to be superimposed on the modified video to be displayed on the display device, the metadata being associated with the predetermined location, said method comprising:

decoding, via a processor configured to execute instructions stored on a memory, the encoded transport stream to generate the modified video data, the metadata, and the second supplemental data; and providing, via the processor, the modified video data and the second supplemental data to the display device such that, based on the metadata, the second supplemental data is not displayed at the predetermined location.

14. The method of claim 13, wherein said providing, via the processor, the modified video data and the second supplemental data to the display device comprises providing the modified video data and the second supplemental data to the display device such that, based on the meta data, the second supplemental data is displayed at a second predetermined location, and wherein the predetermined location is different from the second predetermined location.

15. The method of claim 13, for further use with audio data associated with the first supplemental data, wherein said decoding the encoded transport additionally generates the audio data.

16. A non-transitory, computer-readable media having computer-readable instructions stored thereon, the computer-readable instructions being capable of being read by a decoder for use with an encoded transport stream and a display device, the encoded transport stream including modified video data, metadata, and second supplemental data, the modified video data corresponding to a modified video to be displayed on the display device and by incorporating first supplemental data into video data, the first supplemental data corresponding to a supplemental video to be displayed at a predetermined location when the modified video is displayed on the display device, the video data corresponding to a video to be displayed on the display device, the second supplemental data corresponding to a second supplemental video to be superimposed on the modified video to be displayed on the display device, the metadata being associated with the predetermined location, wherein the computer-readable instructions are capable of instructing the decoder to perform the method comprising:

decoding, via a processor configured to execute instructions stored on a memory, the encoded transport stream to generate the modified video data, the metadata, and the second supplemental data; and providing, via the processor, the modified video data and the second supplemental data to the display device such that, based on the metadata, the second supplemental data is not displayed at the predetermined location.

17. The non-transitory, computer-readable media of claim 16, wherein the computer-readable instructions are capable of instructing the encoder to perform the method wherein said providing, via the processor, the modified video data and the second supplemental data to the display device comprises providing the modified video data and the second supplemental data to the display device such that, based on the meta data, the second supplemental data is displayed at a second predetermined location, and wherein the predetermined location is different from the second predetermined location.

18. The non-transitory, computer-readable media of claim 16, for further use with audio data associated with the first supplemental data, wherein the computer-readable instructions are capable of instructing the encoder to perform the method wherein said decoding the encoded transport additionally generates the audio data.

\* \* \* \* \*